(12) United States Patent
Cheung et al.

(10) Patent No.: US 8,199,745 B2
(45) Date of Patent: Jun. 12, 2012

(54) METHOD AND APPARATUS FOR GENERALIZED THIRD-PARTY CALL CONTROL IN SESSION INITIATION PROTOCOL NETWORKS

(75) Inventors: Eric Cheung, New York, NY (US); Pamela Zave, Chatham, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 777 days.

(21) Appl. No.: 12/345,233

(22) Filed: Dec. 29, 2008

(65) Prior Publication Data
US 2010/0165979 A1  Jul. 1, 2010

(51) Int. Cl.
*H04L 12/66* (2006.01)
(52) U.S. Cl. .................. 370/352; 370/252; 370/401
(58) Field of Classification Search .................. None
See application file for complete search history.

(56) References Cited

U.S. PATENT DOCUMENTS

| | | | |
|---|---|---|---|
| 6,252,879 B1 * | 6/2001 | Zhang | 370/401 |
| 7,619,983 B2 * | 11/2009 | Panigrahy | 370/252 |
| 2004/0008701 A1 * | 1/2004 | Giacomini | 370/401 |
| 2009/0274144 A1 * | 11/2009 | Garg et al. | 370/352 |

* cited by examiner

*Primary Examiner* — Duc C Ho

(57) ABSTRACT

In one embodiment, the present invention is a method and apparatus for generalized third party call control in session initiation protocol networks. In one embodiment, a method for controlling a media negotiation with one or more endpoints in a network includes determining, for each endpoint, a current state of a corresponding port on a third-party controller and transitioning the corresponding port to a new state in accordance with a finite state machine that tracks the state of the media negotiation.

15 Claims, 6 Drawing Sheets

METHOD AND APPARATUS FOR GENERALIZED THIRD-PARTY CALL CONTROL IN SESSION INITIATION PROTOCOL NETWORKS

FIELD OF THE INVENTION

The present invention relates generally to session initiation protocol (SIP) networks and relates more particularly to third-party call control in SIP networks.

The widespread adoption of Voice over Internet Protocol (VoIP) creates opportunities for innovation in new voice, multimedia, and converged (e.g., with web and data) services. SIP is currently the most commonly used open standard for establishing voice and multimedia media sessions. In addition to being an end-to-end signaling protocol, SIP is also useful for invoking intermediary application servers that provide advanced features to the media endpoints (e.g., user devices). One commonly used intermediary application is third-party call control, which is typically used to implement advanced services in VoIP networks. By putting call control logic in an intermediary application server, the endpoints can be kept relatively simple.

Due to the nature of SIP protocol, third-party call control is very prone to race conditions. It is also difficult to support multiple applications concurrently while controlling the media connectivity among the endpoints in a multi-party call. The communications industry is moving toward multiple network or customer premises equipment (CPE)-based applications that cooperate to provide complex service for users. This creates a need for support for general and composable third-party call control.

Thus, there is a need in the art for a method and apparatus for generalized third-party call control in session initiation protocol networks.

SUMMARY OF THE INVENTION

In one embodiment, the present invention is a method and apparatus for generalized third party call control in session initiation protocol networks. In one embodiment, a method for controlling a media negotiation with one or more endpoints in a network includes determining, for each endpoint, a current state of a corresponding port on a third-party controller and transitioning the corresponding port to a new state in accordance with a finite state machine that tracks the state of the media negotiation.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one embodiment, the present invention is method and apparatus for generalized third-party call control in session initiation protocol networks. Embodiments of the invention provide a high-level, goal-oriented approach for applications that control media. A plurality of these applications can cooperate to control media correctly in a composable manner. The underlying technology is a set of logical programs that substantially ensure that the correct sequence of SIP signaling messages is exchanged between the endpoints and the applications.

Within the context of the present invention, the term "third-party call controller" or simply "controller" refers to an entity that is distinct from the media endpoints and that can initiate, manage (e.g., change connectivity among multiple endpoints, change media types selection, change codec selection, etc.), and terminate media sessions. The controller has a signaling relationship with each endpoint involved in a media session using a standard signaling protocol. The endpoints do not need to establish and maintain direct signaling relationships among themselves, but rather maintain indirect signaling relationships via the controller. Thus, from the perspective of each endpoint, the controller appears as a regular peer endpoint (e.g., as in a point-to-point relationship). Media streams subsequently flow directly between the endpoints; the controller does not access or relay the media streams.

Figure 1:
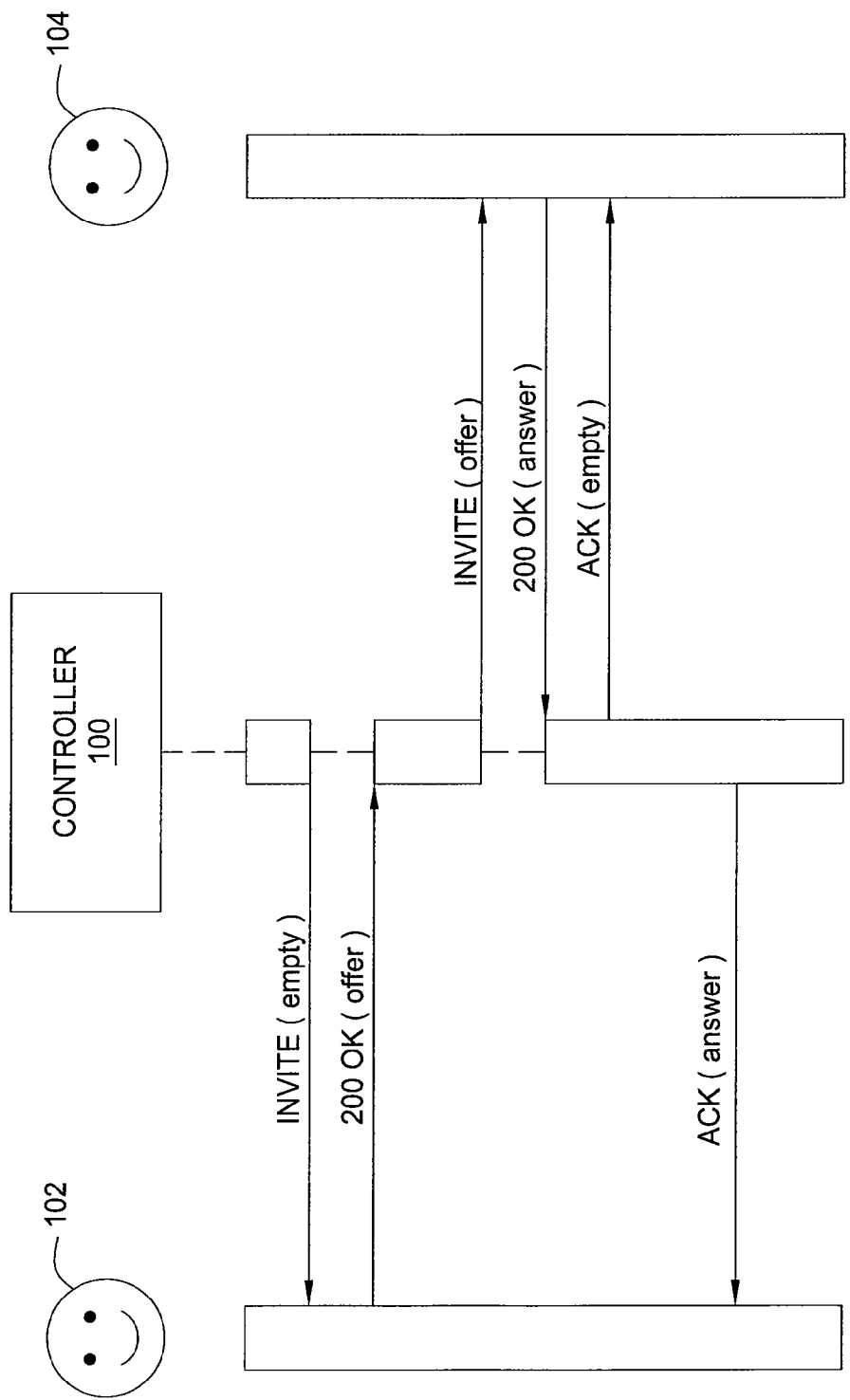
FIG. 1 is a sequence diagram illustrating an exemplary third party controller that executes a "click to dial" SIP application.

FIG. 1, for example, is a sequence diagram illustrating an exemplary third party controller 100 that executes a "click to dial" SIP application, in which a first endpoint 102 initiates a media session with a second endpoint 104 by, for example, clicking a link on a web page. The controller 100 initiates the media session by sending an (empty) INVITE request to the first endpoint 102, where the INVITE request is empty in the sense that it contains no media offer (i.e., list of media streams to include in the media session). The first endpoint 102 responds to the controller with a 200 OK response that includes an offer.

The controller 100 next relays the offer to the second endpoint 104 as an INVITE request, and the second endpoint 104 responds with a 200 OK response as an answer accepting the media session. The controller 100 then responds to the second endpoint 104 with an (empty) ACK message that acknowledges receipt of the 200 OK (answer) response. Finally, the controller 100 conveys the second endpoint's answer to the first endpoint 102 as an ACK message (including the answer).

As illustrated, this transaction involves two distinct SIP dialogs: a first dialog between the controller 100 and the first endpoint 102 (i.e., as illustrated on the left-hand side of FIG. 1) and a second dialog between the controller 100 and the second endpoint 104 (i.e., as illustrated on the right-hand side of FIG. 1). Each of these dialogs includes an offer-answer exchange as embodied in the exchange of the INVITE, 200 OK, and ACK messages. Collectively, the two dialogs represent an end-to-end offer-answer exchange between the first endpoint 102 and the second endpoint 104. This establishes a single media session directly between the first endpoint 102 and the second endpoint 104.

The architecture illustrated in FIG. 1 presents some difficulties in terms of third-party management of media sessions between two or more endpoints. For instance, if one or more of the endpoints is operated by a live person (as opposed to an automated program), this can introduce some delay in the offer-answer exchange (because certain actions cannot take place before certain other actions occur). This delay, in turn, can result in unnecessary retransmission of messages or in termination of a dialog or media session.

Additionally, an offer (e.g., as sent in an INVITE or a 200 OK message), once sent by the controller to one endpoint, cannot be re-sent to another endpoint. This is because in SIP, it is possible to send only one answer to an offer. Moreover, disguising a second answer as a new offer can create an infinite offer-answer loop if an answer to the new offer does not match the original offer. This complicates applications such as calling card applications, in which a controller connects a caller to a first endpoint for authentication and subsequently connects the caller to a second endpoint that is the destination for the call.

Moreover, the architecture of FIG. 1 may limit the codec and media choices available to the endpoints in a media session. Typically, endpoints may perform a plurality of offer-answer exchanges in order to select a codec from a plurality of potential codecs. In such a case, the controller cannot convey outstanding unanswered offers, because doing so may unnecessarily restrict the codec and media choices available for the media session.

In the case of INVITE or re-INVITE requests, a controller cannot send a new request until an outstanding request has received an answer. This asynchrony adds complexity and additional states to the controller's application logic.

In the case where two SIP user agents (UAs) send mid-dialog re-INVITE requests at the same time, a glare condition may arise in which both re-INVITE requests must be rejected, and each party must wait a predefined period of time to re-send the re-INVITE request. This glare condition can also add complexity to the controller's application logic.

In addition, the requirement that sessions descriptions in an offer-answer exchange within a SIP dialog conform to certain restrictions also adds complexity to the controller logic because it requires the controller to constantly parse, modify, and format session description protocol (SDP) in the SIP messages as they are relayed between endpoints.

Embodiments of the present invention provide a controller having generalized logic for use, for example, in VoIP networks that use SIP to establish media sessions between two or more endpoints. The controller provides a safe and robust means of sending SIP messages while ensuring correctness of operation and minimizing issues like race conditions.

At the high level, the controller manages the media connectivity among two or more endpoints, where a discrete SIP dialog exists between the controller and each endpoint. The controller end of this dialog is herein referred to as a "media port" or simply a "port."

In general, the operations of the controller may be divided into two functional, goal-oriented primitives referred to as the "hold" program and the "link" program. These programs are discussed in greater detail below with respect to FIGS. 4 and 5, and are discussed in even greater detail in co-pending, commonly assigned U.S. patent application Ser. No. 11/618,903, filed Dec. 31, 2006, which is herein incorporated by reference in its entirety. In the hold program, the controller isolates an endpoint (e.g., puts the endpoint "on hold"); in the link program, the controller links two endpoints together in a media session. As the controller changes the way that the endpoints are connected, the controller puts the ports corresponding to each endpoint into the appropriate hold or link program. The hold and link programs examine the states of the ports and send SIP requests and responses accordingly to achieve the goals of the program. Thus, the operation of the controller in this respect may be viewed as goal-oriented.

Figure 2:
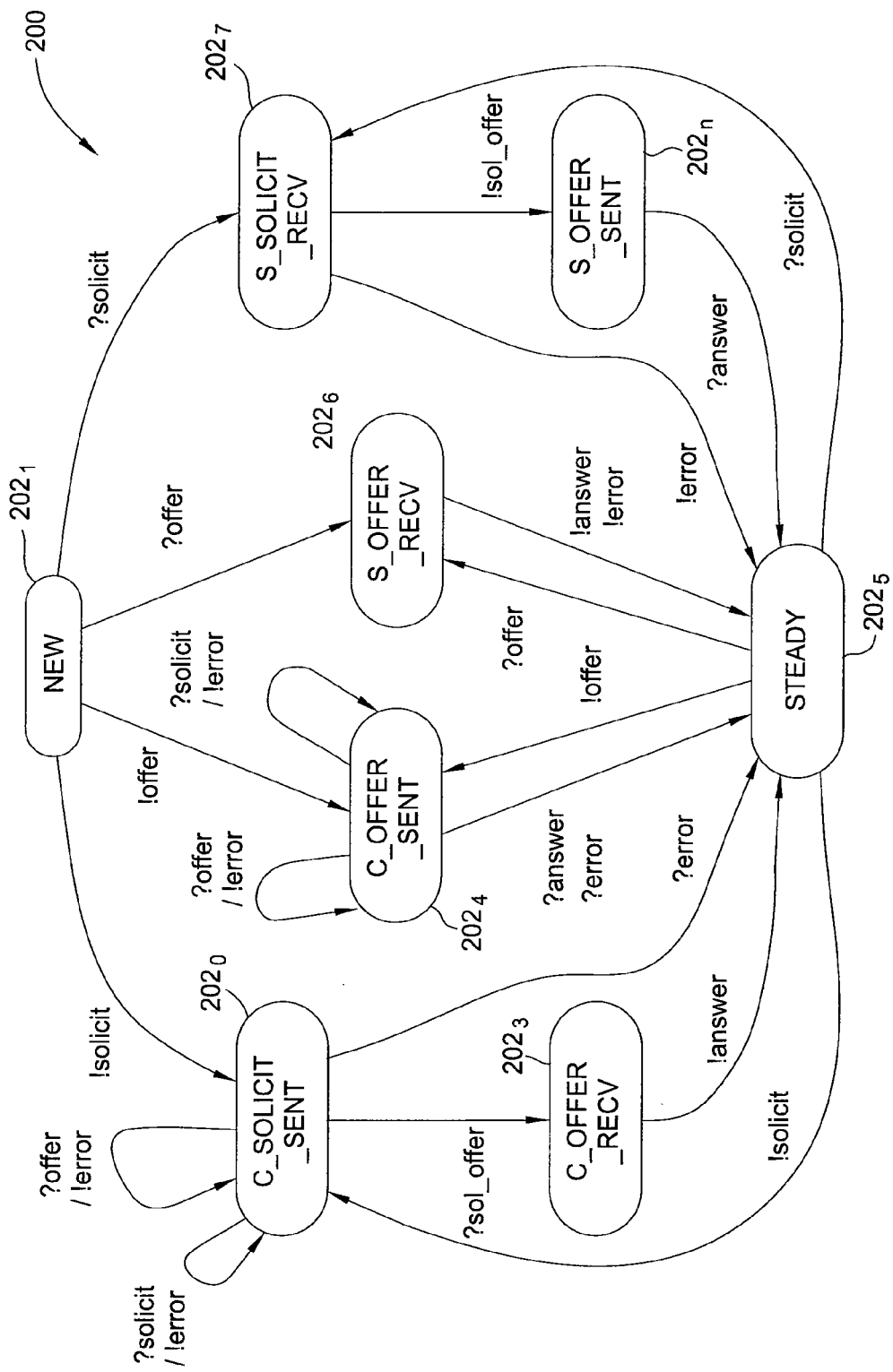
FIG. 2 is a finite state machine illustrating the operations of a single port of a third-party call controller, according to the present invention.

FIG. 2 is a finite state machine 200 illustrating the operations of a single port of a third-party call controller, according to the present invention. In one embodiment, all ports of the controller will operate in accordance with the finite state machine 200. The finite state machine 200 illustrates the manner in which the state of the port changes as the port exchanges SIP messages with an endpoint in a media session controlled by the controller.

The finite state machine 200 comprises a plurality of nodes $202_1$-$202_n$ (hereinafter collectively referred to as "nodes 202"), each node 202 representing a state of the port. State names that start with "C_" indicate that the port is acting as a UA client in the current dialog (i.e., the controller has sent the INVITE or re-INVITE request), while state names that start with "S_" indicate that the port is acting as a UA server in the current dialog.

The nodes 202 are connected by links that indicate the state transitions that cause the port to transition from one state (node) to another. A state transition that is labeled as "!message" indicates that the port is the sender of a message, while a state transition that is labeled as "?message" indicates that the port is the receiver of a message. Thus, the finite state machine 200 controls the type of message that is allowed to be sent by the controller under specified circumstances. When either the endpoint or the controller terminates the SIP dialog (e.g., by sending a BYE request), the finite state machine 200 is destroyed.

As illustrated, the finite state machine 200 starts with the port in the "NEW" state (i.e., as represented by node $202_1$). In the NEW state, four occurrences are possible: (1) the controller may send an empty INVITE message to an endpoint to solicit an offer for a media session (indicated by the state transition "!solicit"); (2) the controller may send a INVITE message including an offer to the endpoint (indicated by the state transition "!offer"); (3) the controller may receive an INVITE message with an offer from the endpoint (indicated by state transition "?offer"); or (4) the controller may receive an empty INVITE message from the endpoint soliciting an offer (indicated by the state transition "?solicit"). As illustrated, each of these state transitions results in the port transitioning to a same or different state (i.e., C_SOLICIT_SENT; C_OFFER_SENT; S_OFFER_RECV; or S_SOLICIT_RECV, respectively). In turn, there is a plurality of state transitions possible from each of these different states.

The finite state machine 200 addresses some interesting circumstances in addition to the more commonplace occurrences. For instance, when the port is in the C_SOLICIT_SENT (node $202_2$) or the C_OFFER_SENT (node $202_4$) state, the port may receive a solicitation or offer from the endpoint due to re-INVITE glare, as discussed above. In such a case, the port will always send an error response (indicated by the state transitions "?solicit/!error" and "?offer/!error"). Typically, the port will then receive an error response from the endpoint (indicated by the state transitions "?error") and then transition to the STEADY state (node $202_5$).

When the port is in the S_OFFER_RECV (node $202_6$) or the S_SOLICIT_RECV (node $202_7$) state, the controller may send an error message on the port if it has received an error from the port connected to the other endpoint in the transaction (i.e., in the case of a "link" application), as indicated by the "!error" state transitions. The port then transitions to the STEADY state (node $202_5$).

Figure 3:
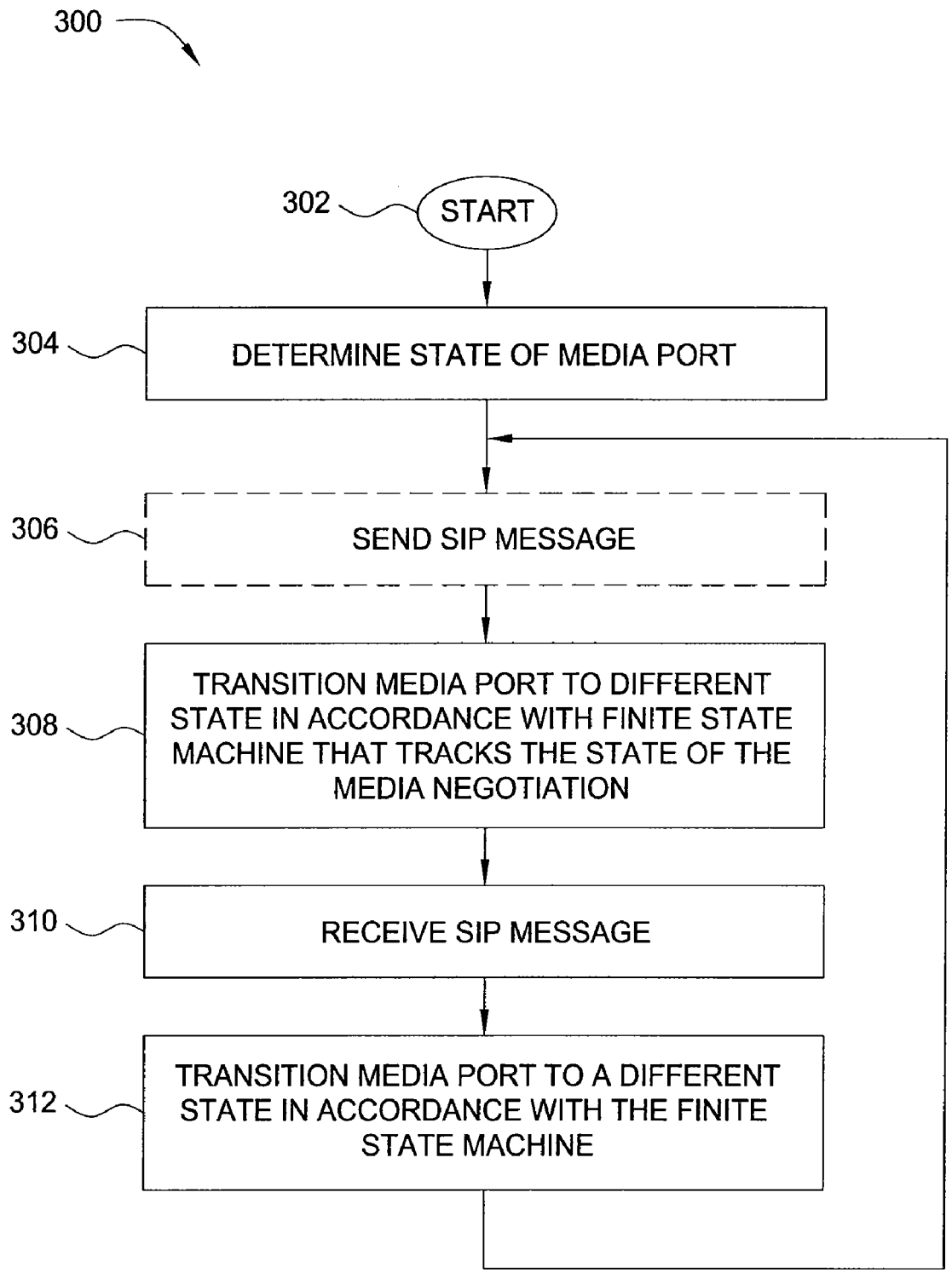
FIG. 3 is a flow diagram illustrating one embodiment of a method for controlling a media negotiation with an endpoint.

FIG. 3 is a flow diagram illustrating one embodiment of a method 300 for controlling a media negotiation with an endpoint. The method 300 may be implemented, for example, at the controller 100 illustrated in FIG. 1 in order to control calls between endpoints in the VoIP network. Moreover, the method 300 illustrates an implementation of the finite state machine 200 illustrated in FIG. 2.

The method 300 is initialized at step 302 and proceeds to step 304, where the method 300 determines the state of the relevant media port. The port may be, for example, a port on which a message has been received from an endpoint. Alternatively, the port may be a port on which the controller has sent a message to the endpoint. In one embodiment, the state of the port may be any of the states illustrated in FIG. 2 (i.e., by nodes 202).

In optional step 306 (illustrated in phantom), the method 300 sends a SIP message (e.g., an INVITE, a 200 OK, or an ACK). The method 300 then proceeds to step 308 and transitions the port to a new (i.e., different, not necessarily the "NEW" state illustrated in FIG. 2, which is designated in uppercase when referred to) state in accordance with a finite state machine that tracks the state of the media negotiation. For example, the method 300 may implement the finite state machine 200 illustrated in FIG. 2 in order to determine what new states are allowable in light of some applied state transition.

In step 310, the method 300 receives a SIP message (e.g., an INVITE, a 200 OK, or an ACK). The method 300 then transitions to a new state once again in accordance with the finite state machine before returning to optional step 306.

Although the method 300 is illustrated as a substantially continuous loop, it is noted that the method 300 may be terminated by certain occurrences. In one embodiment, if the method 300 puts the media port into a new hold or link program, or if the SIP dialog involving the media port has been terminated, then the method 300 is terminated.

Figure 4:
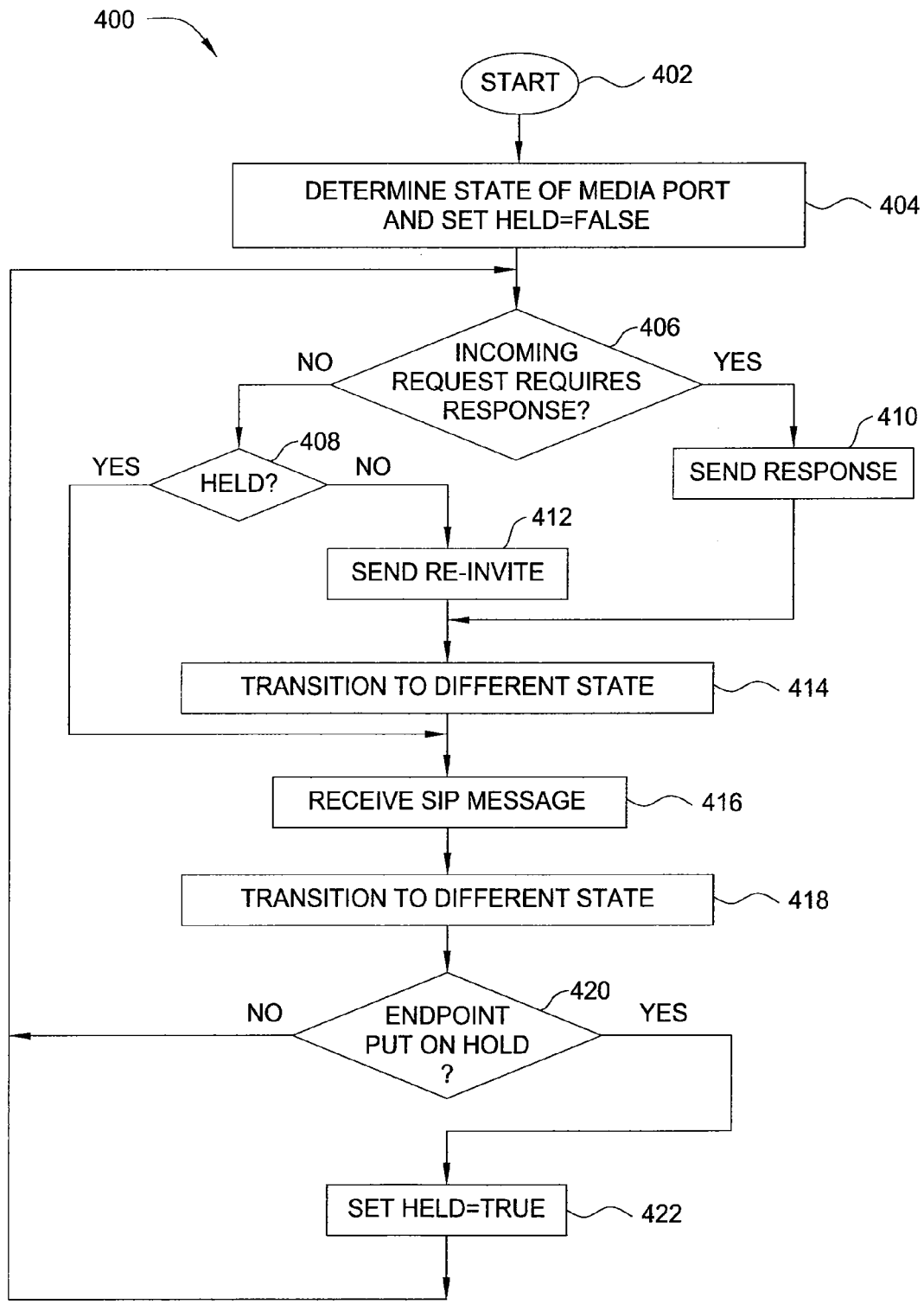
FIG. 4 is a flow diagram illustrating one embodiment of a method for putting an endpoint in a media session "on hold," according to the present invention.

FIG. 4 is a flow diagram illustrating one embodiment of a method 400 for putting an endpoint in a media session "on hold," according to the present invention. The method 400 operates on a single media port. The method 400 may be implemented, for example, as a more specific embodiment of the method 300.

The method 400 is initialized at step 402 and proceeds to step 404, where the method 400 determines the state of a media port associated with the endpoint to be put on hold. In addition, the method 400 sets HELD=FALSE on the port to indicate that the media port is not yet on hold.

In step 406, the method 400 determines whether an incoming request on the media port requires a response. For instance, the controller may have received a message (e.g., an INVITE message containing an offer or a solicitation) on the port from the endpoint. If the method 400 concludes in step 406 that a response to an incoming request requires a response, the method 400 proceeds to step 410 and sends a response to answer the message. In one embodiment, if the message is a new offer, the method 400 sends an answer that disables all media streams (e.g., by setting the port number of each media stream associated with the endpoint to 0). Alternatively, if the message is a solicitation of an offer, the method 400 sends an offer with no media stream. The method 400 then proceeds to step 414 and transitions the media port to a new (different) state, in accordance with a finite state machine that tracks the state of the media negotiation (e.g., such as the finite state machine 200).

On the other hand, if the method 400 concludes in step 406 that a response to an incoming request is not required, the method 400 proceeds to step 408 and determines whether the port is currently on hold (i.e., HELD=TRUE). If the method 400 concludes in step 408 that the port is not currently on hold, the method 400 proceeds to step 412 and sends a re-INVITE message including an offer from the port. In one embodiment, the offer included in the re-INVITE message disables all existing media streams (e.g., by setting the port number of each media stream to 0). The method 400 then proceeds to step 414 and transitions the media port to a new (different) state, as discussed above, before receiving a SIP message (e.g., an INVITE, a 200 OK, or an ACK) in step 416.

Referring back to step 408, if the method 400 concludes that the media port is currently on hold, the method 400 proceeds directly to step 416 and receives the SIP message (i.e., steps 412-414 are bypassed).

In step 418, the method 400 transitions the media port to a new (different) state, in accordance with the finite state machine. The method 400 then proceeds to step 420 and determines whether the endpoint associated with the media port has been put on hold. In one embodiment, this can be inferred from the SIP message received in step 416 (for instance, the SIP message might be an error message associated with a rejected re-INVITE message).

If the method 400 concludes in step 422 that the endpoint has been put on hold, the method sets HELD=TRUE for the media port in step 422 before returning to step 406. Alternatively, if the method 400 concludes in step 422 that the endpoint has not been put on hold, the method 400 returns directly to step 406 (i.e., bypasses step 422).

In certain circumstances, the method 400 may take a "shortcut." For example, if the port is in the S_OFFER_RECV state, the method 400 may send an answer message that immediately disables all media streams.

In some cases, the re-INVITE message sent in step 412 may be rejected due to glare caused by an incoming re-INVITE message. If the incoming re-INVITE message includes an offer, the method 400 may send an answer that disables all media streams (i.e., instead of sending a new offer that disables the media streams).

Figure 5:
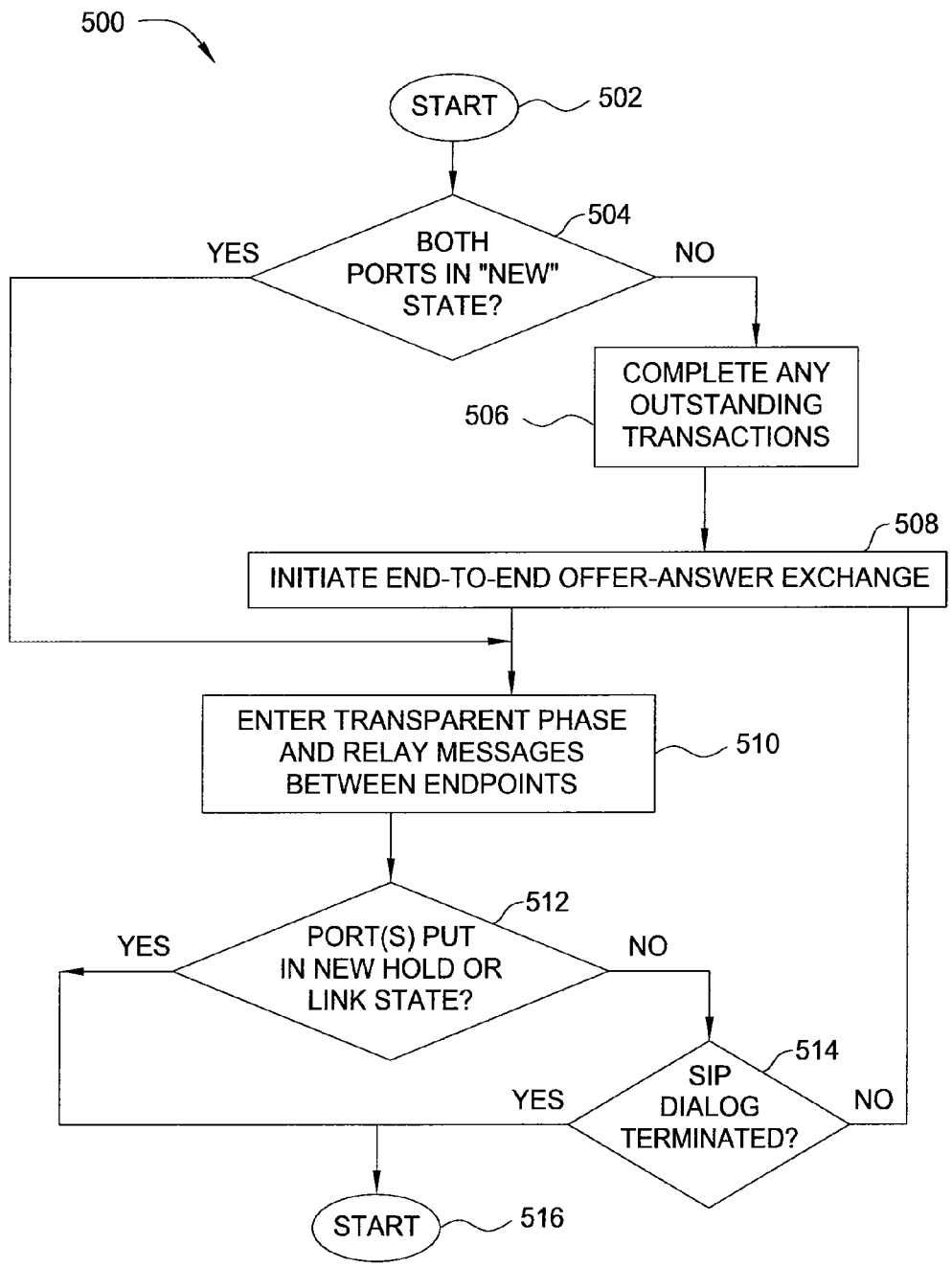
FIG. 5 is a flow diagram illustrating one embodiment of a method for linking two endpoints in a media session, according to the present invention.

FIG. 5 is a flow diagram illustrating one embodiment of a method 500 for linking two endpoints in a media session, according to the present invention. The method 500 operates on a pair of media ports (i.e., one port for each endpoint; thus the method 500 is somewhat more complex than the method 400. The method 500 may be implemented, for example, as a more specific embodiment of the method 300.

The method 500 is initialized at step 502 and proceeds to step 504, where the method 500 examines the states of the two ports involved in the media session and determines whether both ports are in the NEW or STEADY state (e.g., as indicated in FIG. 2). If the method 500 concludes in step 504 that either port is not in the NEW or STEADY state, the method 500 proceeds to step 506 and completes any outstanding transactions, such that the port can transition to the STEADY state. Completion of outstanding transactions depends on the state of the port, and may involve the controller sending an appropriate "dummy" offer or answer. For example, if the port is in the C_OFFER_RECV state, the method 500 can send a dummy answer to prompt a transition to the STEADY state. On the other hand, if the port is in the C_OFFER_SENT state, the method 500 must wait for an answer before transitioning to the STEADY state.

Once any outstanding transactions have been completed and the two ports are in the STEADY state, the method 500 proceeds to step 508 and initiates an end-to-end offer-answer exchange between the endpoints connected to the ports (e.g., in the manner described above with respect to FIG. 1). In one embodiment, this exchange is initiated by sending a solicitation on one of the ports. In some cases, the solicitation may be rejected due to glare. Under such circumstances, the method 500 must handle the incoming message and wait until the states of the ports have transitioned to STEADY. Thus, step 508 may be viewed as a "matching" phase of the overall method 500.

Once the offer-answer exchange has been completed, the method 500 proceeds to step 510 and enters the "transparent" phase. In the transparent phase, the method 500 relays media offers and answers transparently between the endpoints associated with the ports. It is important, however, that the method 500 not create a re-INVITE glare condition in this phase (e.g., by sending a re-INVITE to an endpoint after a re-INVITE has been received from the endpoint.

Once the method 500 enters the transparent phase, it stays in this state and continues to relay messages until such time as the application program modifies the media connectivity by putting the media ports into a new hold or link program, or when one of the endpoints terminates the SIP dialog. In step 512, the method 500 determines whether one or both of the media ports has been put in a new hold or link program. If the method 500 concludes in step 512 that one or both of the media ports has been put in a new hold or link program, the method 500 terminates in step 516.

Alternatively, if the method 500 concludes in step 512 that neither of the media ports has been put in a new hold or link program, the method 500 proceeds to step 514 and determines whether the SIP dialog between the endpoints has been terminated. If the method 500 concludes in step 514 that the SIP dialog has been terminated, the method 500 terminates in step 516. On the other hand, if the method 500 concludes in step 514 that the SIP dialog has not been terminated, the method 500 returns to step 510 and remains in the transparent phase (i.e., continues to relay messages between the endpoints).

In certain circumstances, the method 500 may, like the method 400, take a shortcut if one of the ports is in a particular state. For example, if a first ports is in the C_SOLICIT_SENT state when the method 500 starts, the method 500 does not need to send a solicitation (e.g., as in step 508), because a solicitation has already been sent. However, the method 500 will need to verify that the second port is in either the STEADY or the S_SOLICIT_RECV state. Then, when the first port receives a sol_offer, the method 500 can send an offer or sol_offer on the second port.

The present invention may be extended to support multiple controllers in the call path between media endpoints. This is a common scenario, and often each of the controllers belongs to a different administrative domain (such that there cannot be any overarching framework that coordinates the operations of all controllers). This scenario, however, should not lead to deadlocks, infinite loops, or incorrect end states; rather, the controllers must cooperate to arrive at the correct media connectivity amongst the endpoints. Embodiments of the present invention will converge with any number of controllers to improve performance in such circumstances.

Moreover, embodiments of the present invention offer a concrete blueprint for SIP developers who program third-party call control applications. By adhering to the following steps, such applications can correctly perform media control operations under any transient or race situations: (1) For each endpoint that the application is controlling, track the state of the corresponding media port in accordance with the finite state machine illustrated in FIG. 2; (2) Each port will always be running either a hold program (e.g., as illustrated in FIG. 4) or a link program (e.g., as illustrated in FIG. 5); when a SIP message containing media semantics is received on a port, pass the message to the appropriate program (which may, in turn, decide to send on or more messages on the port or on another port); and (3) When the application performs a media switching operation, put the affected ports into new hold and link programs accordingly.

The structure of this approach lends itself to familiar software development goals of modularity, abstraction, and reuse. The finite state machine of FIG. 2, as well as the methods of FIGS. 3-5, can be implemented as reusable software libraries or objects, providing developers with a high-level, goal-oriented application programming interface for safe and robust media connectivity control.

Figure 6:
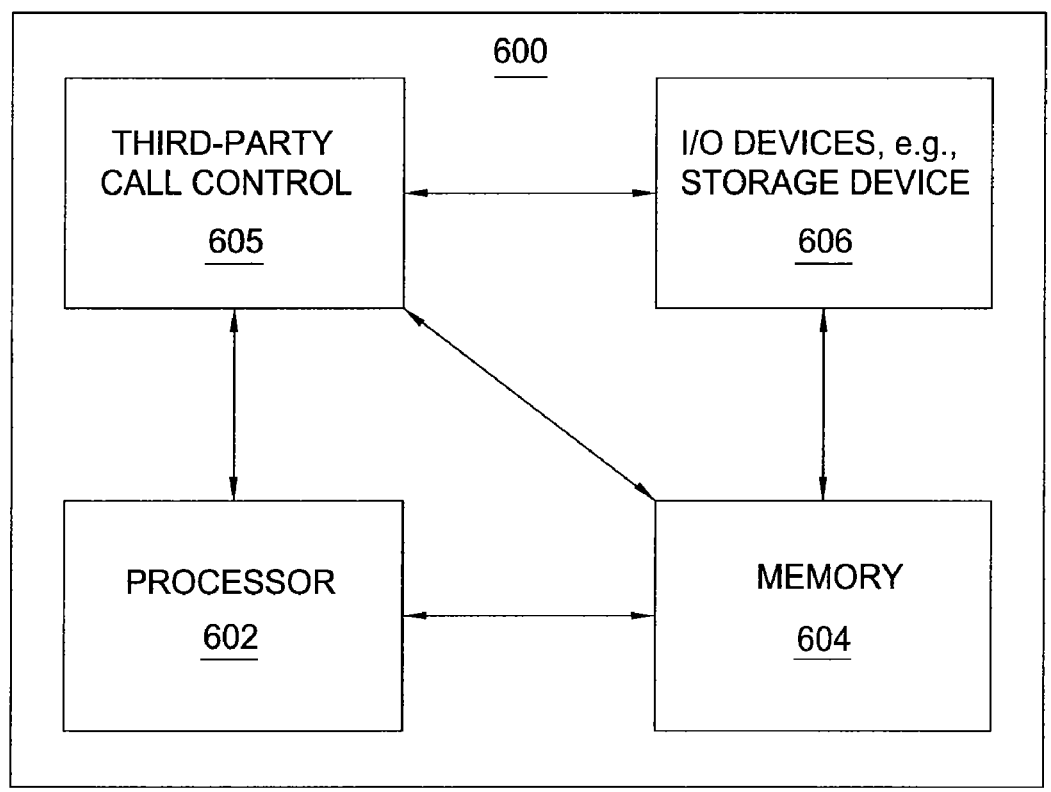
FIG. 6 is a high level block diagram of the third party call control method that is implemented using a general purpose computing device.

FIG. 6 is a high level block diagram of the third party call control method that is implemented using a general purpose computing device 600. In one embodiment, a general purpose computing device 600 comprises a processor 602, a memory 604, a third party call control module 605 and various input/output (I/O) devices 606 such as a display, a keyboard, a mouse, a modem, and the like. In one embodiment, at least one I/O device is a storage device (e.g., a disk drive, an optical disk drive, a floppy disk drive). It should be understood that the third party call control module 605 can be implemented as a physical device or subsystem that is coupled to a processor through a communication channel.

Alternatively, the third party call control module 605 can be represented by one or more software applications (or even a combination of software and hardware, e.g., using Application Specific Integrated Circuits (ASIC)), where the software is loaded from a storage medium (e.g., I/O devices 606) and operated by the processor 602 in the memory 604 of the general purpose computing device 600. Thus, in one embodiment, the third party call control module 605 for controlling media connectivity between endpoints in a VoIP network described herein with reference to the preceding Figures can be stored on a computer readable medium or carrier (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for controlling a media negotiation with an endpoint in a network, comprising:
   determining, for the endpoint, a current state of a corresponding port on a third-party controller; and
   transitioning the corresponding port to a new state in accordance with a finite state machine that tracks a state of the media negotiation, wherein the finite state machine comprises:
   a plurality of nodes, each of the plurality of nodes representing a possible state of the corresponding port, wherein each node of the plurality of nodes represents one of: a state in which the third-party controller is a user agent, and a state in which the third-party controller is a user agent server; and a plurality of links connecting the plurality of nodes, each of the plurality of links representing a potential state transition that causes the corresponding port to transition from a first state to a second state.

2. The method of claim 1, wherein the state in which the third party controller is a user agent client comprises one of: a state in which the third-party controller has sent a solicitation of a media offer on the corresponding port, a state in which the third-party controller has sent a media offer on the corresponding port, and a state in which the third-party controller has received a media offer on the corresponding port in response to the solicitation.

3. The method of claim 1, wherein the state in which the third party controller is a user agent server comprises one of: a state in which the third-party controller has received a solicitation of a media offer on the corresponding port, a state in which the third-party controller has received a media offer on the corresponding port, and a state in which the third-party controller has sent a media offer on the corresponding port in response to the solicitation.

4. The method of claim 1, wherein the finite state machine comprises a goal-oriented primitive.

5. The method of claim 1, wherein the finite state machine controls a type of a message that is sent by the third-party controller on the corresponding port under a specified circumstance.

6. A method for controlling a media negotiation with an endpoint in a network, comprising:
   determining, for the endpoint, a current state of a corresponding port on a third-party controller; and
   transitioning the corresponding port to a new state in accordance with a finite state machine that tracks a state of the media negotiation, wherein the finite state machine comprises:
       a plurality of nodes, each of the plurality of nodes representing a possible state of the corresponding port, wherein one of the plurality of nodes represents a STEADY state in which the corresponding port is involved in a completed session initiation protocol dialog; and
       a plurality of links connecting the plurality of nodes, each of the plurality of links representing a potential state transition that causes the corresponding port to transition from a first state to a second state.

7. A method for controlling a media negotiation with an endpoint in a network, comprising:
   determining, for the endpoint, a current state of a corresponding port on a third-party controller; and
   transitioning the corresponding port to a new state in accordance with a finite state machine that tracks a state of the media negotiation, wherein the finite state machine comprises a goal-oriented primitive, wherein the goal-oriented primitive comprises:
       a method by which the third-party controller puts the endpoint on hold; and
       a method by which the third-party controller links the endpoint to another endpoint.

8. A non-transitory computer readable storage medium having stored thereon a plurality of instructions, the plurality of instructions including instructions which, when executed by a processor, cause the processor to perform a method for controlling a media negotiation with an endpoint in a network, comprising:
   determining, for the endpoint, a current state of a corresponding port on a third-party controller; and
   transitioning the corresponding port to a new state in accordance with a finite state machine that tracks a state of the media negotiation, wherein the finite state machine comprises:
       a plurality of nodes, each of the plurality of nodes representing a possible state of the corresponding port, wherein each node of the plurality of nodes represents one of: a state in which the third-party controller is a user agent, and a state in which the third-party controller is a user agent server; and
       a plurality of links connecting the plurality of nodes, each of the plurality of links representing a potential state transition that causes the corresponding port to transition from a first state to a second state.

9. The non-transitory computer readable storage medium of claim 8, wherein the state in which the third party controller is a user agent client comprises one of: a state in which the third-party controller has sent a solicitation of a media offer on the corresponding port, a state in which the third-party controller has sent a media offer on the corresponding port, and a state in which the third-party controller has received a media offer on the corresponding port in response to the solicitation.

10. The non-transitory computer readable storage medium of claim 8, wherein the state in which the third party controller is a user agent server comprises one of: a state in which the third-party controller has received a solicitation of a media offer on the corresponding port, a state in which the third-party controller has received a media offer on the corresponding port, and a state in which the third-party controller has sent a media offer on the corresponding port in response to the solicitation.

11. The non-transitory computer readable storage medium of claim 8, wherein the finite state machine comprises a goal-oriented primitive.

12. The non-transitory computer readable storage medium of claim 8, wherein the finite state machine controls a type of a message that is sent by the third-party controller on the corresponding port under a specified circumstance.

13. A non-transitory computer readable storage medium having stored thereon a plurality of instructions, the plurality of instructions including instructions which, when executed by a processor, cause the processor to perform a method for controlling a media negotiation with an endpoint in a network, comprising:
   determining, for the endpoint, a current state of a corresponding port on a third-party controller; and
   transitioning the corresponding port to a new state in accordance with a finite state machine that tracks a state of the media negotiation, wherein the finite state machine comprises:
       a plurality of nodes, each of the plurality of nodes representing a possible state of the corresponding port, wherein one of the plurality of nodes represents a STEADY state in which the corresponding port is involved in a completed session initiation protocol dialog; and
       a plurality of links connecting the plurality of nodes, each of the plurality of links representing a potential state transition that causes the corresponding port to transition from a first state to a second state.

14. A non-transitory computer readable storage medium having stored thereon a plurality of instructions, the plurality of instructions including instructions which, when executed by a processor, cause the processor to perform a method for controlling a media negotiation with an endpoint in a network, comprising:

determining, for the endpoint, a current state of a corresponding port on a third-party controller; and transitioning the corresponding port to a new state in accordance with a finite state machine that tracks a state of the media negotiation, wherein the finite state machine comprises a goal-oriented primitive, wherein the goal-oriented primitive comprises:

a method by which the third-party controller puts the endpoint on hold; and a method by which the third-party controller links the endpoint to another endpoint.

15. A third-party controller, comprising:

a processor; and a computer readable medium in communication with the processor, wherein the computer readable medium has stored thereon a plurality of instructions, the plurality of instructions including instructions which, when executed by the processor, cause the processor to perform a method for controlling a media negotiation with a user device comprising:

determining, for the user device, a current state of a corresponding port on the third-party controller; and transitioning the corresponding port to a new state in accordance with a finite state machine that tracks a state of the media negotiation, wherein the finite state machine comprises:

a plurality of nodes, each of the plurality of nodes representing a possible state of the corresponding port, wherein each node of the plurality of nodes represents one of: a state in which the third-party controller is a user agent, and a state in which the third-party controller is a user agent server; and a plurality of links connecting the plurality of nodes, each of the plurality of links representing a potential state transition that causes the corresponding port to transition from a first state to a second state.

* * * * *